US010988898B2

(12) United States Patent
Zhou et al.

(10) Patent No.: US 10,988,898 B2
(45) Date of Patent: Apr. 27, 2021

(54) METHOD FOR PREPARING ACTIVE CARBON-BASED SPECIAL SYNTHETIC PAPER

(71) Applicant: HUNAN UNIVERSITY OF SCIENCE AND TECHNOLOGY, Hunan (CN)

(72) Inventors: Hu Zhou, Hunan (CN); Zhiling Qi, Hunan (CN); Dongdong Wang, Hunan (CN); Zhihua Zhou, Hunan (CN); Xuan Liu, Hunan (CN); Qingquan Liu, Hunan (CN); Xiaohong Wang, Hunan (CN)

(73) Assignee: HUNAN UNIVERSITY OF SCIENCE AND TECHNOLOGY, Xiangtan (CN)

( * ) Notice: Subject to any disclaimer, the term of this patent is extended or adjusted under 35 U.S.C. 154(b) by 161 days.

(21) Appl. No.: 16/009,181

(22) Filed: Jun. 14, 2018

(65) Prior Publication Data

US 2018/0291559 A1 Oct. 11, 2018

Related U.S. Application Data

(63) Continuation of application No. PCT/CN2017/074021, filed on Feb. 18, 2017.

(30) Foreign Application Priority Data

Oct. 31, 2016 (CN) .......................... 201610928034.6

(51) Int. Cl.
| | | |
|---|---|---|
| *D21H 17/63* | (2006.01) | |
| *D21H 27/00* | (2006.01) | |
| *D21H 17/57* | (2006.01) | |
| *D21H 25/06* | (2006.01) | |
| *D21H 13/50* | (2006.01) | |
| *D21H 21/52* | (2006.01) | |
| *C08L 75/06* | (2006.01) | |
| *C08L 75/08* | (2006.01) | |
| *C08J 3/21* | (2006.01) | |
| *C08J 5/18* | (2006.01) | |

(Continued)

(52) U.S. Cl.
CPC .............. *D21H 17/63* (2013.01); *C08J 3/212* (2013.01); *C08J 5/18* (2013.01); *C08L 75/06* (2013.01); *C08L 75/08* (2013.01); *D21H 13/50* (2013.01); *D21H 17/57* (2013.01); *D21H 21/52* (2013.01); *D21H 25/06* (2013.01); *D21H 27/001* (2013.01); *C08J 2375/06* (2013.01); *C08J 2375/08* (2013.01); *C08K 3/04* (2013.01); *C08K 7/24* (2013.01); *C08K 2201/003* (2013.01); *C08K 2201/005* (2013.01); *C08L 2201/56* (2013.01); *C08L 2203/16* (2013.01)

(58) Field of Classification Search
CPC ........ D21H 17/57; D21H 25/06; D21H 13/20; D21H 17/07; D21H 17/63; D21H 17/675; D21H 19/385; D21H 19/62; D21H 19/72; D21H 21/52; D21H 27/00; D21H 27/001; D21H 13/50; C09D 175/06; C09D 175/08; C09D 175/04; C08J 2375/06; C08J 2375/08; C08J 3/212; C08J 5/18; C08K 2201/003; C08K 2201/005; C08K 3/04; C08K 7/24; C08L 2201/56; C08L 2203/16; C08L 75/06; C08L 75/08
See application file for complete search history.

(56) References Cited

U.S. PATENT DOCUMENTS 3,650,880 A * 3/1972 Tieniber ..................... C08J 9/28
    442/76
3,794,548 A * 2/1974 Wirth et al. ......... D06N 3/0095
    428/91

(Continued)

FOREIGN PATENT DOCUMENTS

| CN | 101173093 A | 5/2008 |
| CN | 101255274 A | 9/2008 |

(Continued)

OTHER PUBLICATIONS

Paul et al., "Antimicrobial, Mechanical and Thermal Studies of Silver Particle-Loaded Polyurethane" Journal Biomaterials, 4, pp. 358-375. (Year: 2013).*

(Continued)

*Primary Examiner* — Jose A Fortuna

(57) ABSTRACT

A method for preparing active carbon-based special synthetic paper capable of degrading harmful substances in environment, including: stirring polyurethane particles and a solvent in a reactor, and standing to completely dissolve the polyurethane particles to obtain a polyurethane solution; adding active carbon having harmful substances adsorption property in the obtained polyurethane solution, stirring and mixing uniformly to obtain a solid-liquid mixture; coating the obtained solid-liquid mixture onto a piece of release paper, soaking the release paper coated with the solid-liquid mixture into an aqueous solution of silver nitrate having photocatalytic degradation property, completely curing the solid-liquid mixture to form a film, and soaking the release paper and the film into an aqueous solution of sodium chloride; drying the obtained release paper and the film in an electric blast drying oven, and stripping the film from the release paper to obtain the active carbon-based special synthetic paper.

8 Claims, No Drawings

(51) Int. Cl.
*C08K 3/04* (2006.01)
*C08K 7/24* (2006.01)

(56) References Cited

U.S. PATENT DOCUMENTS

| | | | | |
|---|---|---|---|---|
| 4,157,424 | A * | 6/1979 | Boutle | D06N 3/0088 521/61 |
| 4,448,922 | A * | 5/1984 | McCartney | C08G 18/0804 524/443 |
| 5,326,567 | A * | 7/1994 | Capelli | A46D 1/00 424/405 |
| 6,777,524 | B1 * | 8/2004 | Shimizu | C08G 18/10 528/59 |
| 8,728,501 | B2 * | 5/2014 | Fan | C01G 23/0536 424/401 |
| 9,540,498 | B1 * | 1/2017 | Scheffer | C08J 7/0427 |
| 10,537,838 | B2 * | 1/2020 | Wang | C02F 1/50 |
| 2008/0004395 | A1 * | 1/2008 | Covelli | C08G 18/12 524/591 |
| 2008/0279960 | A1 * | 11/2008 | Burton | A01N 59/16 424/618 |
| 2009/0247658 | A1 * | 10/2009 | Kobayashi | C08G 18/10 521/159 |
| 2009/0253848 | A1 * | 10/2009 | Koecher | A01N 59/16 524/440 |
| 2011/0201734 | A1 * | 8/2011 | Liu | C08G 18/0823 524/196 |
| 2012/0237584 | A1 * | 9/2012 | Burton | A01N 59/16 424/402 |
| 2013/0236719 | A1 * | 9/2013 | Ohwada | B29C 51/002 428/327 |
| 2014/0205759 | A1 * | 7/2014 | Satgurunathan | C08G 18/0823 427/388.4 |
| 2014/0335200 | A1 * | 11/2014 | Zhang | A01N 59/16 424/618 |
| 2016/0136584 | A1 * | 5/2016 | Hwang | B29C 70/504 210/483 |
| 2018/0169552 | A1 * | 6/2018 | Wang | C02F 1/288 |
| 2018/0291559 | A1 * | 10/2018 | Zhou | D21H 21/52 |
| 2018/0291560 | A1 * | 10/2018 | Zhou | D21H 27/00 |
| 2019/0225834 | A1 * | 7/2019 | Ho | C08G 18/289 |
| 2020/0095730 | A1 * | 3/2020 | Ekman | D21D 5/28 |

FOREIGN PATENT DOCUMENTS

| | | | |
|---|---|---|---|
| CN | 102205964 | A * | 10/2011 |
| CN | 102432898 | A | 5/2012 |
| CN | 102776789 | A | 11/2012 |
| CN | 103265900 | A | 8/2013 |
| CN | 104674606 | A | 6/2015 |
| CN | 104746382 | A | 7/2015 |
| GB | 2453200 | A | 4/2009 |

OTHER PUBLICATIONS

Machine translation of CN102604030 A. (Year: 2012).*
Machine translation of JP 2004-256794 A. (Year: 2004).*
Machine Translation of ON 102604030 A. (Year: 2012).*

* cited by examiner

METHOD FOR PREPARING ACTIVE CARBON-BASED SPECIAL SYNTHETIC PAPER

TECHNICAL FIELD

The present invention belongs to the technical field of the production of composites, and in particular to a method for preparing active carbon-based special synthetic paper.

BACKGROUND OF THE PRESENT INVENTION

Active carbon-based special paper is also called active carbon paper. The active carbon paper is special paper that is prepared from plant fiber and active carbon and characterized by large specific surface area and external surface area, high adsorption volume, high adsorption efficiency, ease of use and the like. As one of novel material products, the active carbon paper is an important reform in the utilization of active carbon.

The plant fiber used during the production of the active carbon paper needs to be chopped and boiled at a high temperature in high-concentration alkaline water; subsequently, the alkaline water contained in the primary pulp is removed by machines such as centrifugal screens, high-frequency vibrating screens, pulp washers or press filters; and finally, the pulp is bleached and then used for paper-making with active carbon. On one hand, the production process of the active carbon paper is complicated, and a large amount of industrial waste liquid will be produced, which pollutes the environment. On the other hand, the plant fiber is mainly obtained from wood and massive deforestation will damage the ecological environment to a certain extent. Meanwhile, since the overall structure of the existing active carbon paper is generally compact, the surface area of the special paper products in contact with the environment is decreased greatly. Consequently, the adsorption performance of the active carbon paper is reduced, and the range of application of the active carbon paper is limited to a certain extent. It can be known from the above description that the existing active carbon paper products mainly have the disadvantages of ecological destruction, environmental pollution, compact overall structure of the products, limited adsorption performance and the like. Therefore, it is necessary to improve the production process for active carbon paper in order to expand its application fields.

SUMMARY OF THE PRESENT INVENTION

An objective of present invention is to provide a method for preparing active carbon-based special synthetic paper, which is easily available in raw material, simple and reliable in process and environmentally-friendly.

The objective of the present invention is realized by the following technical solutions.

A method for preparing active carbon-based special synthetic paper is provided, including the following steps:

(1) stirring 15 to 20 parts by weight of polyurethane particles and 50 to 150 parts by weight of a solvent in a reactor for 30 min, and standing for 48 h to completely dissolve the polyurethane particles in the solvent to obtain a polyurethane solution;

(2) adding 2 to 25 parts by weight of active carbon in the polyurethane solution obtained in the step (1), stirring for 1 h, and mixing uniformly to obtain a solid-liquid mixture;

(3) coating the solid-liquid mixture obtained in the step (2) onto a piece of release paper, soaking the release paper and the solid-liquid mixture into an aqueous solution of silver nitrate, completely curing the solid-liquid mixture to form a film, and soaking the release paper and the film into an aqueous solution of sodium chloride for 30 min;

(4) drying the release paper and the film obtained in the step (3) in an electric blast drying oven for 1 h, and stripping the film from the release paper;

(5) cutting the film product to a proper size as required to obtain the active carbon-based special synthetic paper.

Preferably, the polyurethane particles in the step (1) are at least one of polyester-based thermoplastic polyurethane particles and polyether-based thermoplastic polyurethane particles, having a Shore hardness of 85 A to 95 A.

Preferably, the solvent in the step (1) is at least one of N,N-dimethylformamide and N,N-dimethylacetamide.

Preferably, the active carbon in the step (2) is one of or a mixture of more than two of active carbon having a particle size of 325 meshes, active carbon having a particle size of 400 meshes, active carbon having a particle size of 500 meshes and active carbon having a particle size of 600 meshes.

Preferably, the concentration of the aqueous solution of silver nitrate in the step (3) is 12%.

Preferably, the concentration of the aqueous solution of sodium chloride in the step (3) is 6%.

Preferably, the temperature in the electric blast drying oven in the step (4) is 50° C.

Preferably, the active carbon-based special synthetic paper obtained in the step (5) is gray, the thickness of the special synthetic paper is controlled between 0.06 mm and 0.16 mm by adjusting the thickness of the solid-liquid mixture coated onto the release paper in the step (3), and the mass of the special synthetic paper as a piece of A4 paper is 4.0 g to 5.4 g.

Compared with the existing production processes for active carbon paper, the present invention has the following characteristics.

(1) In the present invention, by the active carbon powder inside the special synthetic paper and the porous and loose structure of the special synthetic paper, the adsorption of harmful substances in the environment by the special synthetic paper is greatly improved.

(2) During the production of the present invention, silver-containing compounds generated inside the synthetic paper can photocatalytically degrade benzene, formaldehyde and other substances adsorbed onto the special synthetic paper and can decompose these substances into nontoxic substances, thereby improving the environment.

DETAILED DESCRIPTION OF THE PRESENT INVENTION

The present invention will be further described below in detail by specific embodiments. The raw materials are industrial products, and the equipment is ordinary industrialized production equipment.

Embodiment 1

15 kg of polyester-based thermoplastic polyurethane having a Shore hardness of 85 A and 55 kg of N,N-dimethylformamide were added in a reactor, stirred for 30 min and stood for 48 h to completely dissolve the polyester-based thermoplastic polyurethane in the N,N-dimethylformamide. Then, the solution was added with 10 kg of active carbon in 325 meshes and stirred for 1 h to obtain a solid-liquid mixture. The obtained solid-liquid mixture was stood for defoaming and then coated onto a piece of release paper. The release paper and the solid-liquid mixture were immediately soaked into an aqueous solution of silver nitrate having a concentration of 12%. After the solid-liquid mixture was completely cured to form a film, the release paper and the film were soaked into an aqueous solution of sodium chloride having a concentration of 6% for 30 min. The release paper and the film were taken out and then dried in an electric blast drying oven for 1 h at 50° C., and the film was stripped from the release paper. The total thickness of the film is controlled as 0.06 mm by adjusting the thickness of the solid-liquid mixture coated onto the release paper. Finally, the film product was cut to a proper size as required to obtain the active carbon-based special synthetic paper product.

In this embodiment, the obtained special synthetic paper product was gray, 0.06 mm in thickness and 4.0 g in mass (as a piece of A4 paper).

Embodiment 2

15 kg of polyether-based thermoplastic polyurethane having a Shore hardness of 90 A and 150 kg of N,N-dimethylacetamide were added in a reactor, stirred for 30 min and stood for 48 h to completely dissolve the polyether-based thermoplastic polyurethane in the N,N-dimethylacetamide. Then, the solution was added with 25 kg of active carbon in 400 meshes and stirred for 1 h to obtain a solid-liquid mixture. The obtained solid-liquid mixture was stood for deforming and then coated onto a piece of release paper. The release paper and the solid-liquid mixture were immediately soaked into an aqueous solution of silver nitrate having a concentration of 12%. After the solid-liquid mixture was completely cured to form a film, the release paper and the film were soaked into an aqueous solution of sodium chloride having a concentration of 6% for 30 min. The release paper and the film were taken out and then dried in an electric blast drying oven for 1 h at 50° C., and the film was stripped from the release paper. The total thickness of the film is controlled as 0.08 mm by adjusting the thickness of the solid-liquid mixture coated onto the release paper. Finally, the film product was cut to a proper size as required to obtain the active carbon-based special synthetic paper product.

In this embodiment, the obtained special synthetic paper product was gray, 0.08 mm in thickness and 4.3 g in mass (as a piece of A4 paper).

Embodiment 3

20 kg of polyester-based thermoplastic polyurethane having a Shore hardness of 95 A and 100 kg of N,N-dimethylformamide were added in a reactor, stirred for 30 min and stood for 48 h to completely dissolve the polyester-based thermoplastic polyurethane in the N,N-dimethylformamide. Then, the solution was added with 20 kg of active carbon in 500 meshes and stirred for 1 h to obtain a solid-liquid mixture. The obtained solid-liquid mixture was stood for defoaming and then coated onto a piece of release paper. The release paper and the solid-liquid mixture were immediately soaked into an aqueous solution of silver nitrate having a concentration of 12%. After the solid-liquid mixture was completely cured to form a film, the release paper and the film were soaked into an aqueous solution of sodium chloride having a concentration of 6% for 30 min. The release paper and the film were taken out and then dried in an in an electric blast drying oven for 1 h at 50° C., and the film was stripped from the release paper. The total thickness of the film is controlled as 0.10 mm by adjusting the thickness of the solid-liquid mixture coated onto the release paper. Finally, the film product was cut to a proper size as required to obtain the active carbon-based special synthetic paper product.

In this embodiment, the obtained special synthetic paper product was gray, 0.10 mm in thickness and 4.7 g in mass (as a piece of A4 paper).

Embodiment 4

18 kg of polyether-based thermoplastic polyurethane having a Shore hardness of 94 A and 50 kg of N,N-dimethylacetamide were added in a reactor, stirred for 30 min and stood for 48 h to completely dissolve the polyether-based thermoplastic polyurethane in the N,N-dimethylacetamide. Then, the solution was added with 2 kg of active carbon in 600 meshes and stirred for 1 h to obtain a solid-liquid mixture. The obtained solid-liquid mixture was stood for defoaming and then coated onto a piece of release paper. The release paper and the solid-liquid mixture were immediately soaked into an aqueous solution of silver nitrate having a concentration of 12%. After the solid-liquid mixture was completely cured to form a film, the release paper and the film were soaked into an aqueous solution of sodium chloride having a concentration of 6% for 30 min. The release paper and the film were taken out and then dried in an electric blast drying oven for 1 h at 50° C., and the film was stripped from the release paper. The total thickness of the film is controlled as 0.12 mm by adjusting the thickness of the solid-liquid mixture coated onto the release paper. Finally, the film product was cut to a proper size as required to obtain the active carbon-based special synthetic paper product.

In this embodiment, the obtained special synthetic paper product was gray, 0.12 mm in thickness and 5.0 g in mass (as a piece of A4 paper).

Embodiment 5

20 kg of polyester-based thermoplastic polyurethane having a Shore hardness of 86 A and 57 kg of N,N-dimethylformamide were added in a reactor, stirred for 30 min and stood for 48 h to completely dissolve the polyester-based thermoplastic polyurethane in the N,N-dimethylformamide. Then, the solution was added with 1.25 kg of active carbon in 325 meshes, 1.25 kg of active carbon in 400 meshes, 1.25 kg of active carbon in 500 meshes and 1.25 kg of active carbon in 600 meshes and stirred for 1 h to obtain a solid-liquid mixture. The obtained solid-liquid mixture was stood for defoaming and then coated onto a piece of release paper. The release paper and the solid-liquid mixture were immediately soaked into an aqueous solution of silver nitrate having a concentration of 12%. After the solid-liquid mixture was completely cured to form a film, the release paper and the film were soaked into an aqueous solution of sodium chloride having a concentration of 6% for 30 min. The release paper and the film were taken out and then dried in an electric blast drying oven for 1 h at 50° C., and the film was stripped from the release paper. The total thickness of the film is controlled as 0.16 mm by adjusting the thickness of the solid-liquid mixture coated onto the release paper.

Finally, the film product was cut to a proper size as required to obtain the active carbon-based special synthetic paper product.

In this embodiment, the obtained special synthetic paper product was gray, 0.16 mm in thickness and 5.4 g in mass (as a piece of A4 paper).

What is claimed is:

1. A method for preparing active carbon-based special synthetic paper capable of degrading harmful substances in environment, comprising the following steps:
    (1) stirring 15 to 20 parts by weight of polyurethane particles and 50 to 150 parts by weight of a solvent in a reactor for 30 min, and standing for 48 h to completely dissolve the polyurethane particles in the solvent to obtain a polyurethane solution;
    (2) adding 2 to 25 parts by weight of active carbon having harmful substances adsorption property in the polyurethane solution obtained in the step (1), stirring for 1 h, and mixing uniformly to obtain a solid-liquid mixture;
    (3) coating the solid-liquid mixture obtained in the step (2) onto a piece of release paper, soaking the release paper coated with the solid-liquid mixture into an aqueous solution of silver nitrate having photocatalytic degradation property, completely curing the solid-liquid mixture to form a film, and soaking the release paper and the film into an aqueous solution of sodium chloride for 30 min;
    (4) drying the release paper and the film obtained in the step (3) in an electric blast drying oven for 1 h, and stripping the film from the release paper;
    (5) cutting the film product to a proper size as required to obtain the active carbon-based special synthetic paper.

2. The method for preparing active carbon-based special synthetic paper according to claim 1, wherein the polyurethane particles in the step (1) are at least one of polyester-based thermoplastic polyurethane particles and polyether-based thermoplastic polyurethane particles, having a Shore hardness of 85 A to 95 A.

3. The method for preparing active carbon-based special synthetic paper according to claim 1, wherein the solvent in the step (1) is at least one of N,N-dimethylformamide and N,N-dimethylacetamide.

4. The method for preparing active carbon-based special synthetic paper according to claim 1, wherein the active carbon in the step (2) is one of or a mixture of more than two of active carbon having a particle size of 325 meshes, active carbon having a particle size of 400 meshes, active carbon having a particle size of 500 meshes and active carbon having a particle size of 600 meshes.

5. The method for preparing active carbon-based special synthetic paper according to claim 1, wherein the concentration of the aqueous solution of silver nitrate in the step (3) is 12%.

6. The method for preparing active carbon-based special synthetic paper according to claim 1, wherein the concentration of the aqueous solution of sodium chloride in the step (3) is 6%.

7. The method for preparing active carbon-based special synthetic paper according to claim 1, wherein the temperature in the electric blast drying oven in the step (4) is 50° C.

8. The method for preparing active carbon-based special synthetic paper according to claim 1, wherein the active carbon-based special synthetic paper obtained in the step (5) is gray, the thickness of the special synthetic paper is controlled between 0.06 mm and 0.16 mm by adjusting the thickness of the solid-liquid mixture coated onto the release paper in the step (3), and the mass of the special synthetic paper as a piece of A4 paper is 4.0 g to 5.4 g.

* * * * *